United States Patent
Tang et al.

(10) Patent No.: US 8,432,990 B2
(45) Date of Patent: Apr. 30, 2013

(54) SYSTEM AND METHOD FOR EMPLOYING A SIX-BIT RANK 1 CODEBOOK FOR FOUR TRANSMIT ANTENNAS

(75) Inventors: Yang Tang, San Diego, CA (US); Yajun Kou, San Diego, CA (US); Young Hoon Kwon, San Diego, CA (US); Tao Wu, Carlsbad, CA (US)

(73) Assignee: FutureWei Technologies, Inc., Plano, TX (US)

( * ) Notice: Subject to any disclaimer, the term of this patent is extended or adjusted under 35 U.S.C. 154(b) by 636 days.

(21) Appl. No.: 12/579,221

(22) Filed: Oct. 14, 2009

(65) Prior Publication Data

US 2010/0142599 A1   Jun. 10, 2010

Related U.S. Application Data

(60) Provisional application No. 61/105,301, filed on Oct. 14, 2008.

(51) Int. Cl.
*H04B 7/02* (2006.01)
(52) U.S. Cl.
USPC ........... 375/267; 375/260; 375/261; 375/271; 375/295; 375/316
(58) Field of Classification Search .................. 375/259, 375/260, 261, 263, 264, 267, 271, 285, 295, 375/316, 322, 330, 338, 340, 347, 349
See application file for complete search history.

(56) References Cited

U.S. PATENT DOCUMENTS

| | | | |
|---|---|---|---|
| 5,852,630 A * | 12/1998 | Langberg et al. | 375/219 |
| 7,330,701 B2 | 2/2008 | Mukkavilli et al. | |
| 7,961,810 B2 * | 6/2011 | Varadarajan et al. | 375/295 |
| 8,223,872 B1 * | 7/2012 | Zhang et al. | 375/267 |
| 8,311,144 B1 * | 11/2012 | Sun et al. | 375/267 |
| 2007/0191066 A1 | 8/2007 | Khojastepour et al. | |
| 2008/0037669 A1 * | 2/2008 | Pan et al. | 375/260 |
| 2008/0095258 A1 | 4/2008 | She et al. | |
| 2008/0165875 A1 * | 7/2008 | Mundarath et al. | 375/262 |
| 2008/0219373 A1 | 9/2008 | Zhang et al. | |
| 2008/0298482 A1 * | 12/2008 | Rensburg et al. | 375/260 |
| 2009/0080549 A1 * | 3/2009 | Khan et al. | 375/260 |
| 2009/0252240 A1 * | 10/2009 | Kwon et al. | 375/260 |
| 2010/0266054 A1 * | 10/2010 | Mielczarek et al. | 375/260 |
| 2010/0272209 A1 * | 10/2010 | Lee et al. | 375/295 |
| 2010/0322223 A1 * | 12/2010 | Choi et al. | 370/342 |
| 2011/0051828 A1 * | 3/2011 | Kent et al. | 375/260 |
| 2011/0058621 A1 * | 3/2011 | Clerckx et al. | 375/267 |

OTHER PUBLICATIONS

International Search Report and Written Opinion of the Patent Cooperation Treaty, International Application No. PCT/US09/60688, Mailed Dec. 3, 2009, 8 pages.

* cited by examiner

*Primary Examiner* — Hirdepal Singh
(74) *Attorney, Agent, or Firm* — Slater & Matsil, L.L.P.

(57) ABSTRACT

A system and method for employing a six-bit rank 1 codebook for four transmit antennas is provided. A method for communications device operation includes estimating a communications channel between the communications device and a controller serving the communications device, thereby producing a channel estimate, quantizing the channel estimate using a codebook, thereby producing a selected codeword, and transmitting an index corresponding to the selected codeword from the codebook to the controller. The codebook includes a plurality of first level codewords, and each first level codeword includes a plurality of subsidiary codewords.

23 Claims, 4 Drawing Sheets

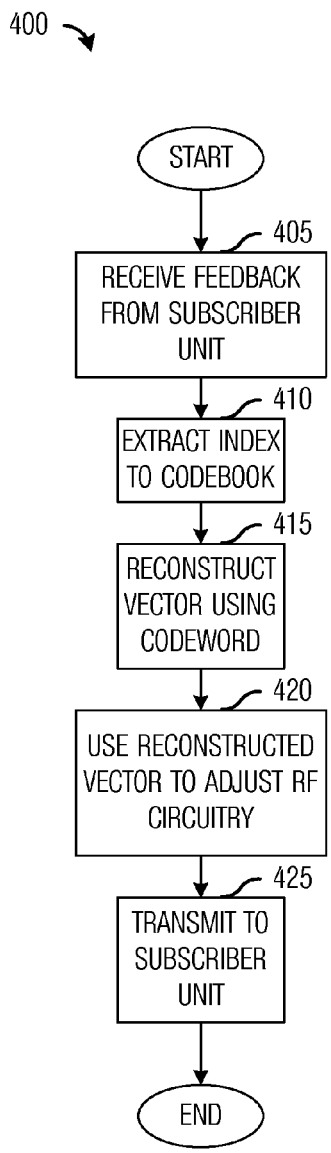
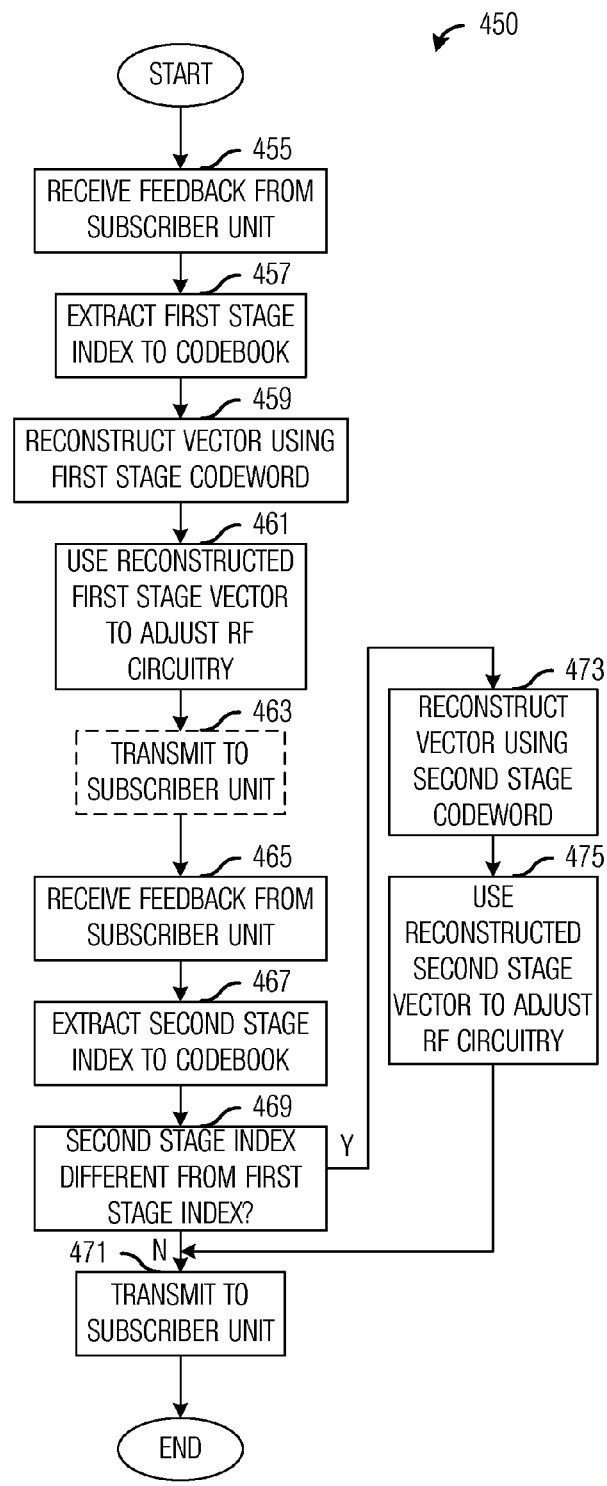
Fig. 4a
Fig. 4b

SYSTEM AND METHOD FOR EMPLOYING A SIX-BIT RANK 1 CODEBOOK FOR FOUR TRANSMIT ANTENNAS

This application claims the benefit of U.S. Provisional Application No. 61/105,301, filed on Oct. 14, 2008, entitled "Six-Bit Rank 1 Codebook for 4 Transmit Antennas," which application is hereby incorporated herein by reference.

TECHNICAL FIELD

The present invention relates generally to wireless communications, and more particularly to a system and method for employing a six-bit rank 1 codebook for four transmit antennas.

BACKGROUND

Communication system capacity generally may be significantly improved when the transmitter has full or partial channel state information (CSI). CSI may be obtained by the transmitter via a reverse feedback channel between the transmitter and the receiver. To accommodate the limited feedback channel bandwidth, CSI normally is quantized into digital format at the receiver before feeding back to the transmitter. A codebook based algorithm generally is one of the most efficient ways to quantize the channel. A generic codebook may consist of multiple codewords. In general, the codeword is selected based on certain selection criteria and the corresponding codeword index is fed back from the receiver to the transmitter. The principles for codeword selection may be varied based on different precoding techniques.

A codebook comprises a set of precoding vectors (matrices). At least one of these vectors (matrices), also referred to as codeword, may be chosen by a mobile station (the receiver) and a related feedback message, which can be the codeword itself or its index, will be sent to the base station (the transmitter). The base station may use the vectors (matrices) to help improve the performance of transmissions to the mobile station.

Existing codebooks suffer significant challenges, however, including shortcomings in performance for both correlated and uncorrelated channels, and complexity involved in codeword searching and differential feedback. What is needed, then, is a codebook and method of using same to overcome these disadvantages in the prior art.

SUMMARY OF THE INVENTION

These and other problems are generally solved or circumvented, and technical advantages are generally achieved, by embodiments of a system and method for employing a six-bit rank 1 codebook for four transmit antennas.

In accordance with an embodiment, a method for communications device operation is provided. The method includes estimating a communications channel between the communications device and a controller serving the communications device, thereby producing a channel estimate, quantizing the channel estimate using a codebook, thereby producing a selected codeword, and transmitting an index corresponding to the selected codeword from the codebook to the controller. The codebook has a plurality of first level codewords, and wherein each first level codeword includes a plurality of subsidiary codewords.

In accordance with another embodiment, a method for communications device operation is provided. The method includes estimating a communications channel between the communications device and a controller serving the communications device, thereby producing a channel estimate, performing a first stage quantization of the channel estimate using a codebook, thereby producing a selected first level codeword, and transmitting a first index corresponding to the selected first level codeword from the codebook to the controller. The codebook includes a plurality of first level codewords, each first level codeword has a plurality of subsidiary codewords, and the first stage quantization uses only the plurality of first level codewords. The method also includes performing a second stage quantization of the channel estimate using the codebook, thereby producing a selected codeword, and transmitting a second index corresponding to the selected codeword from the codebook to the controller. The second stage quantization uses the entirety of the codebook.

In accordance with another embodiment, a method for controller operation is provided. The method includes receiving a first channel state information (CSI) from a communications device, reconstructing a first channel estimate using the codebook and the first index, adjusting transmission circuitry in the controller using the reconstructed first channel estimate, and receiving a second CSI from a communications device, wherein the second CSI comprises a second index to a codeword in the codebook. The first CSI includes a first index to a first level codeword in a codebook, the codebook includes a plurality of first level codewords, with each first level codeword having a plurality of subsidiary codewords. The method also includes in response to determining that the first index is different from the second index, reconstructing a second channel estimate using the codebook and the second index, and adjusting transmission circuitry in the controller using the reconstructed second channel estimate. The method further includes transmitting a first transmission to the communications device using the adjusted transmission circuitry.

An advantage of an embodiment is that hierarchical searching of a codebook is supported to reduce codeword searching overhead.

A further advantage of an embodiment is that the codebook is hierarchical in nature, which permits differential feedback, thereby reducing feedback overhead.

Yet another advantage of an embodiment is that good performance is provided for both correlated and uncorrelated communications channels.

The foregoing has outlined rather broadly the features and technical advantages of the present invention in order that the detailed description of the embodiments that follow may be better understood. Additional features and advantages of the embodiments will be described hereinafter which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the embodiments, and the advantages thereof, reference is now made to the following descriptions taken in conjunction with the accompanying drawings, in which:

FIG. 4a is a flow diagram of base station operations in transmitting information to a subscriber unit; and FIG. 4b is a flow diagram of base station operations in transmitting information to a subscriber unit, wherein the BS receives CSI from the subscriber unit in two stages.

DETAILED DESCRIPTION OF ILLUSTRATIVE EMBODIMENTS

The making and using of the embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The embodiments will be described in a specific context, namely a MIMO wireless communications system that makes use of channel state information to improve overall system efficiency. The MIMO wireless communications may be single-user (SU-MIMO) or multi-user (MU-MIMO) and may be compliant with any of a variety of technical standards, such as Long Term Evolution (LTE), LTE-Advanced, WiMAX, IEEE 802.16, and so forth.

Figure 1:
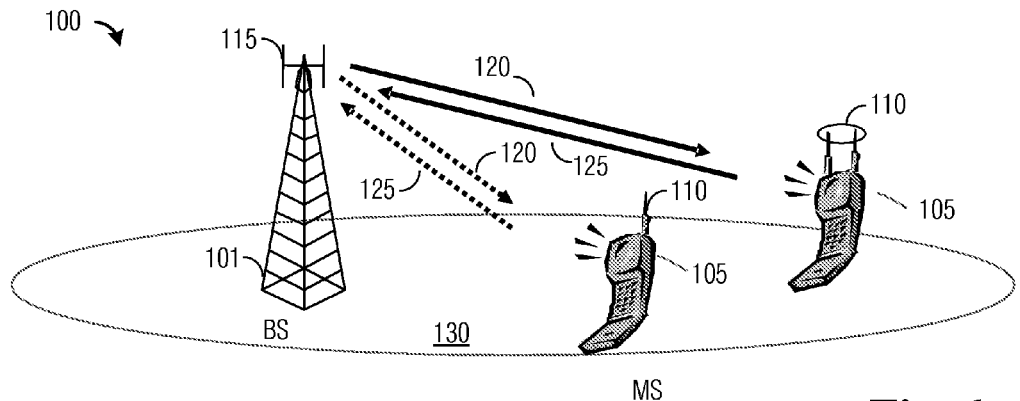
FIG. 1 is a diagram of a wireless communication system.

FIG. 1 illustrates a wireless communication system 100. Wireless communications system 100 includes a base station (BS) 101 and a plurality of subscriber units 105, which may be mobile or fixed. BS 101 and subscriber units 105 communicate using wireless communication. BS may also be referred to as base transceiver stations, Node Bs, enhanced Node Bs, and so forth, while subscriber units may also be referred to as mobile stations, terminals, mobile devices, user equipment, and the like.

BS 101 has a plurality of transmit antennas 115 while subscriber units 105 have one or more receive antennas 110. BS 101 sends control information and data to subscriber units 105 through a downlink (DL) channel 120 while subscriber units 105 send control information and data to BS 101 through uplink (UL) channel 125.

Subscriber units 105 may send control information (including channel state information (CSI)) on uplink channel 125 to improve the quality of the transmission on downlink channel 120. BS 101 may send control information on downlink channel 120 for the purpose of improving the quality of uplink channel 125. A cell 130 is a conventional term for the coverage area of BS 101. It is generally understood that in wireless communication system 100 there may be multiple cells corresponding to multiple BSs.

In order to reduce control information overhead, subscriber unit 105 may quantize the CSI. For example, instead of sending the CSI as analog values, subscriber unit 105 may quantize the analog values to a specified number of bits, such as two, three, four, five, and so forth, and transmit the quantized CSI to BS 101.

To further reduce control information overhead, subscriber unit 105 may use a codebook and transmit an index to a codeword in the codebook in place of the quantized CSI to BS 101. The index fedback to BS 101 represents a codeword in the codebook that is closest to the quantized CSI.

Since only the index is fedback to BS 101, the codebook must be known by both BS 101 and subscriber units 105. The codebook may be pre-specified and stored in BS 101 and subscriber units 105 for subsequent use. Alternatively, the codebook may be provided to subscriber units 105 when subscriber units 105 attaches to BS 101. In yet another alternative, the codebook may be periodically provided to subscriber units 105. In a further alternative, the codebook may be provided to both BS 101 and subscriber units 105, either at initialization or periodically.

Figure 2A:
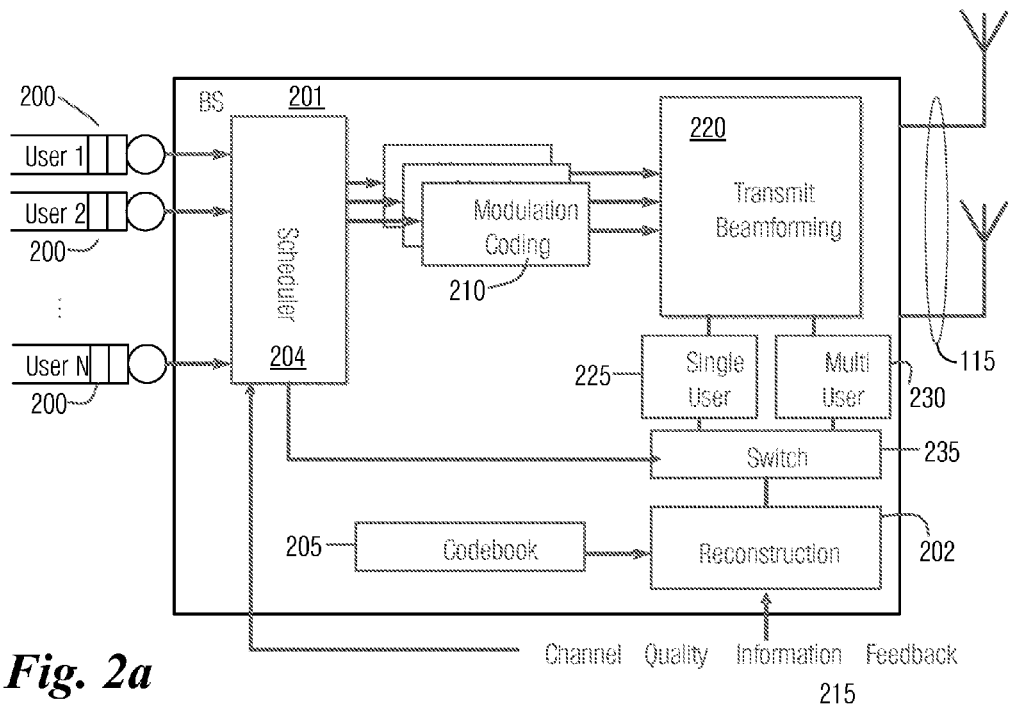
FIG. 2a is a diagram of a base station.

FIG. 2a illustrates a BS 201. Data 200, in the form of bits, symbols, or packets for example, destined for a plurality of subscriber units being served are sent to a scheduler 204, which decides which subscriber units will transmit in a given time/frequency opportunity. Data from subscriber units selected for transmission are processed by modulation and coding block 210 to convert to transmitted symbols and add redundancy for the purpose of assisting with error correction or error detection. The modulation and coding scheme is chosen based in part on information about the channel quality information feedback 215.

The output of modulation and coding block 210 is passed to a transmit beamforming block 220, which maps the modulated and coded stream for each subscriber unit onto a beamforming vector. The beamformed outputs are coupled to antennas 115 through RF circuitry. The transmit beamforming vectors are input from single user block 225 or multi-user block 230. Either beamforming for a single user or multi-user beamforming may be employed, as determined by switch 235, based on information from scheduler 204 and channel quality information feedback 215. Part of each subscriber units' channel quality information feedback includes a new feedback message that provides indices corresponding to quantized channel information as described in the embodiments.

Reconstruction block 202 uses the indices in channel quality information feedback 215 combined with a codebook 205 to reconstruct a high-resolution estimate of the quantized channel state information (CSI). The output of reconstruction block 202 is passed to switch 235 that forwards the information to either the single user block 225 or the multi-user block 230. Other information may also be passed to these blocks, for example a SINR estimate may be passed to the multi-user block 230 to improve its performance. Single user block 225 uses the output of reconstruction block 202 as the beamforming vector for the selected user.

Multi-user block 230 combines the codeword and other information from multiple users to derive the transmit beamforming vectors employed for each subscriber unit. It may use any number of algorithms known in the literature including zero forcing, coordinated beamforming, minimum mean squared error beamforming, or lattice reduction aided precoding, for example.

Scheduler 204 may use any of the known scheduling disciplines in the literature including round robin, maximum sum rate, proportional fair, minimum remaining processing time, or maximum weighted sum rate; generally scheduling decisions are based on channel quality information feedback 215 received from the plurality of subscriber units. Scheduler 204 may decide to send information to a single subscriber unit via transmit beamforming or may decide to serve multiple subscriber units simultaneously through multiuser MIMO communication.

Modulation and coding block 210 may perform any number of coding and modulation techniques including quadrature amplitude modulation, phase shift keying, frequency shift keying, differential phase modulation, convolutional coding, turbo coding, bit interleaved convolutional coding, low density parity check coding, fountain coding, or block coding. The choice of modulation and coding rate in a preferred embodiment is made based on channel quality information feedback 215 in a preferred embodiment and may be determined jointly in scheduler 204.

While not explicitly illustrated, it is obvious to those of ordinary skill in the art that OFDM modulation can be used. Further, any number of multiple access techniques could be used including orthogonal frequency division multiple access; code division multiple access; frequency division multiple access; or time division multiple access. The multiple access technique may be combined with the modulation and coding block 210 or the transmit beamforming block 220 among others.

Channel quality information feedback 215 may, for purposes of illustration, be in the form of quantized channel measurements, modulation, coding, and/or spatial formatting decisions, received signal strength, and signal-to-interference-plus-noise measurements.

Figure 2B:
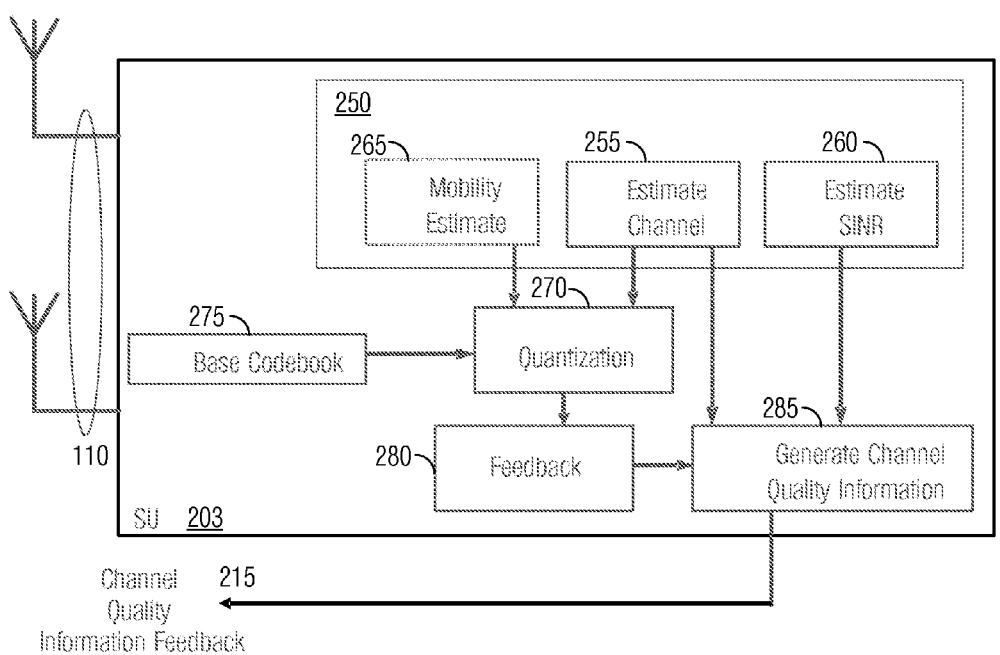
FIG. 2b is a diagram of a subscriber unit.

FIG. 2b illustrates subscriber unit 203. Subscriber unit 203 may have one or more receive antennas 110, connecting through RF circuitry to a receiver signal processing block 250. Some of the key functions performed by receiver signal processing block 250 include channel estimation block 255, estimate SINR block 260, and a mobility estimate block 265.

Channel state information is quantized using a quantization block 270 as described in the embodiments. Quantization block 270 quantizes the received signal to a codebook 275. An index from codebook 275 may be output from quantization block 270. An estimate of the amount of channel variation, produced by mobility estimate block 265, may be used to improve the quantization algorithm by initializing the algorithm from a previous quantization level or adjusting the amount of localization.

Feedback block 280 generates a new feedback message by combining the codebook indices output from quantization block 270. Generate channel quality information block 285 generates a special feedback control message employing the outputs of feedback block 280 to produce channel quality information feedback 215.

Channel estimation block 255 may employ any number algorithms known in the art including least squares, maximum likelihood, maximum a postiori, Bayes estimator, adaptive estimator, or a blind estimator. Some algorithms exploit known information inserted into the transmit signal in the form of training signals, training pilots, while others use structure in the transmitted signal such as cyclostationarity to estimate coefficients of the channel between the BS and the subscriber unit.

Estimate SINR block 260 outputs some measure of performance corresponding to the desired signal. In one embodiment this consists of a received signal power to interference plus noise estimate. In another embodiment, it provides an estimate of the received signal-to-noise ratio. In yet another embodiment, it provides an estimate of the average received signal power, averaged over subcarriers in an OFDM system.

Figure 3A:
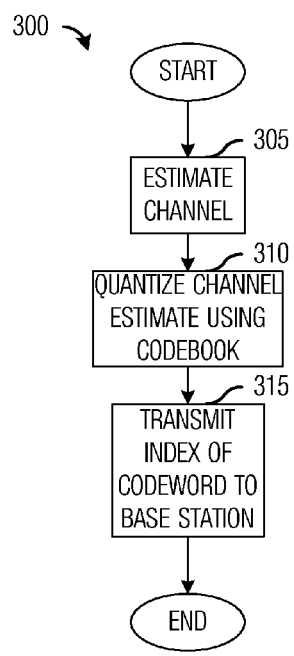
FIG. 3a is a flow diagram of subscriber unit operations in providing channel state information to a base station.

FIG. 3a illustrates a flow diagram of subscriber unit operations 300 in providing CSI to a BS. Subscriber unit operations 300 may be indicative of operations occurring in a subscriber unit, such as subscriber unit 203, as the subscriber unit provides CSI to a BS, such as BS 201. Subscriber unit operations 203 may occur periodically while the subscriber unit is in a normal operating mode after the subscriber unit has become attached to the BS. Subscriber unit operations 300 may continue for as long as the subscriber unit remains attached to the BS. In an alternative embodiment, subscriber unit operations 300 may occur after the subscriber unit receives a message from the BS indicating that the subscriber unit should provide CSI to the BS.

Subscriber unit operations 300 may begin with the subscriber unit estimating a communications channel between itself and the BS that is serving it to produce a channel estimate (block 305). After estimating the channel, the subscriber unit may then quantize the channel estimate using a codebook (block 310). The channel estimate may be normalized prior to being quantized. The subscriber unit may then transmit an index corresponding to the quantized channel estimate (i.e., the codeword) to the BS (block 315). Subscriber unit operations 300 may then terminate.

Figure 3B:
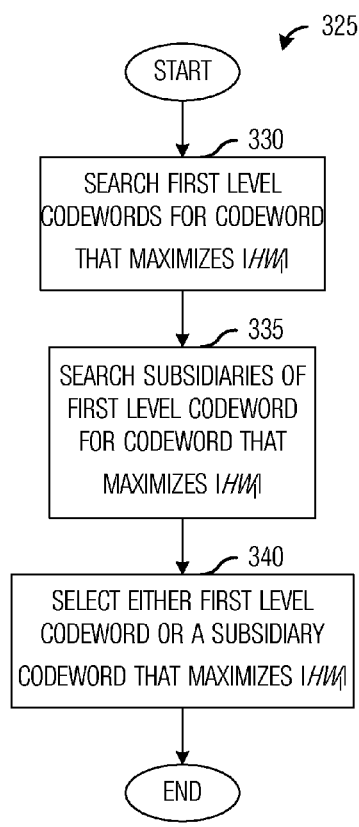
FIG. 3b is a flow diagram of subscriber unit operations in quantizing a channel estimate using a codebook.

FIG. 3b illustrates a flow diagram of subscriber unit operations 325 in quantizing a channel estimate using a codebook. Subscriber unit operations 325 may be indicative of operations occurring in a subscriber unit, such as subscriber unit 203, as the subscriber unit provides CSI to a BS, such as BS 201. Subscriber unit operations 325 may occur each time that the subscriber unit provides CSI to the BS, which may occur periodically or on command from the BS. Subscriber unit operations 325 may be an implementation of block 310 of FIG. 3a, quantizing a channel estimate using a codebook.

Subscriber unit operations 325 may begin after the subscriber unit has estimated the communications channel between itself and the BS that is serving it. With the channel estimate, the subscriber unit may search among a first level of codewords in the codebook for a codeword that maximizes $|HW_i|$, $i \in [1, \ldots, \# \text{ codewords}]$, where H is a channel matrix, and $W_i$ are codewords of codebook W (block 330).

For example, let W be a codebook of 64 codewords and is expressible as $W = D \times [W_1; \ldots; W_{64}]$, in which D is the phase rotation diagonal matrix and given by:

$$D = \begin{bmatrix} e^{j\theta_1} & 0 & \ldots & 0 \\ 0 & e^{j\theta_2} & \ddots & \vdots \\ \vdots & \ddots & \ddots & 0 \\ 0 & \ldots & 0 & e^{j\theta_{64}} \end{bmatrix},$$

where $\theta_i \in [0, 2\pi)$, $i \in [1, \ldots, 64]$

Let a codeword $W_i$ in codebook W be expressible as:

$W_{4i+j} = U_i K^H z_j$, $i \in [0, \ldots, 15]$, $j \in [1, \ldots, 4]$, where $Z = [z_1, z_2, z_3, z_4]$ and $K = [z_1, k_2, k_3, k_4]$ are two 4×4 unitary matrices, $Z_j$ is the j-th column of Z. Matrices Z and K do not have to be identical. $C = [c_1, \ldots, c_{16}]$ is a 4×16 matrix, where $c_i$, $i \in [1, \ldots, 16]$ is 4×1 vector, and $U_i$ is a 4×4 unitary matrix denoted by $U_i = [c_i, u_{i2}, u_{i3}, u_{i4}]$.

Additional detail on codebook W and codeword $W_i$ is provided below.

With codebook W as defined above, the first level of codewords in codebook W are codewords $[W_1, W_5, W_9, W_{13}, W_{17}, W_{21}, W_{25}, W_{29}, W_{33}, W_{37}, W_{41}, W_{45}, W_{49}, W_{53}, W_{57}, W_{61}]$. In general, the first level of codewords may be denoted $W_{4k+1}$, $k \in [0, \ldots, 15]$. Without loss of generality, assume that $|HW_1| \geq |HW_2| \geq \ldots \geq |HW_{61}|$.

It is defined that the subsidiary codewords of the codeword $W_{4k+1}$, $k \in [0, \ldots, 15]$ are $[W_{4k+2}, W_{4k+3}, W_{4k+4}]$. In block 330, the codewords corresponding to M the largest $|HW_{4k+1}|$ are denoted by $[W_1, W_5, \ldots, W_{4M+1}]$. Consequently, their corresponding subsidiary codewords are searched.

After selecting a codeword from the first level of codewords in codebook W that maximizes $|HW_i|$, $i\in[1, \ldots, 64]$ or $|HW_i|$, $i\in[1, \ldots, \#$ first level codewords], the subscriber unit may search in the subsidiary codewords of the codeword that maximized $|HW_i|$, $i\in[1, \ldots, 64]$ or $|HW_i|$, $i\in[1, \ldots, \#$ subsidiary codewords] (block 335). For example, if $W_{29}$ maximizes $|HW_i|$, $i\in[1, \ldots, 64]$, then the subsidiary codewords of $W_{29}$, namely $W_{30}$, $W_{31}$, and $W_{32}$ will be searched.

The codeword that is selected as the quantized version of the channel estimate, i.e., either the codeword from the first level of codewords or one of its three subsidiary codewords, is the codeword that maximizes $|HW_i|$, $i\in[1, \ldots, 64]$ (block 340). In an embodiment, if the codeword from the first level of codewords and one of its subsidiary codeword substantially equally maximizes $|HW_i|$, $i\in[1, \ldots, 64]$, then the codeword from the first level of codewords is selected. In an alternate embodiment, the codeword is selected at random if more than one codeword substantially equally maximizes $|HW_i|$, $i\in[1, \ldots, 64]$. Subscriber unit operations 325 may then terminate.

The quantization of the channel estimate may also occur in two-stages. In a first stage a potentially sub-ideal quantization of the channel estimate may be obtained and in a second stage a potentially ideal quantization of the channel estimate may be obtained. An advantage of the two-stage quantization is that a quick but potentially sub-ideal quantization of the channel estimate may be obtained and made available for use, then at a later time, a potentially better quantization may be obtained.

Figures 3C, 3D:
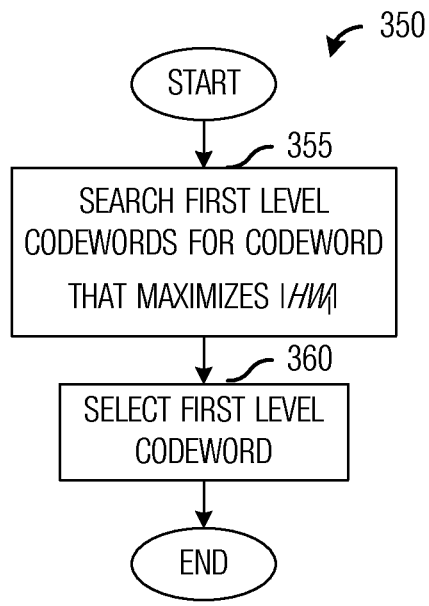
FIG. 3c is a flow diagram of subscriber unit operations in a first stage of a two-stage quantization of a channel estimate using a codebook.
FIG. 3d is a flow diagram of subscriber unit operations in a second stage of a two-stage quantization of a channel estimate using a codebook.

FIG. 3c illustrates a flow diagram of subscriber unit operations 350 in a first stage of a two-stage quantization of a channel estimate using a codebook. Subscriber unit operations 350 may be indicative of operations occurring in a subscriber unit, such as subscriber unit 203, as the subscriber unit provides CSI to a BS, such as BS 201. Subscriber unit operations 350 may occur each time that the subscriber unit provides CSI to the BS, which may occur periodically or on command from the BS. Subscriber unit operations 350 may be an implementation of block 310 of FIG. 3a, quantizing a channel estimate using a codebook.

Subscriber unit operations 350 may begin with the subscriber unit searching among a first level of codewords in the codebook for a codeword that maximizes $|HW_i|$, $i\in[1, \ldots, \#$ codewords] (block 355). The subscriber unit may then select the codeword in the first level of codewords that maximizes $|HW_i|$, $i\in[1, \ldots, \#$ codewords] as a first-stage quantization of the channel estimate (block 360). Subscriber unit operations 350 may then terminate.

FIG. 3d illustrates a flow diagram of subscriber unit operations 375 in a second stage of a two-stage quantization of a channel estimate using a codebook. Subscriber unit operations 375 may be indicative of operations occurring in a subscriber unit, such as subscriber unit 203, as the subscriber unit provides CSI to a BS, such as BS 201. Subscriber unit operations 375 may occur each time that the subscriber unit provides CSI to the BS, which may occur periodically or on command from the BS. Subscriber unit operations 375 may be an implementation of block 310 of FIG. 3a, quantizing a channel estimate using a codebook.

Subscriber unit operations 375 may begin with the subscriber unit searching in the subsidiary codewords of the codeword in the first level of codewords that maximizes $|HW_i|$, $i\in[1, \ldots, \#$ codewords] for a codeword that maximizes $|HW_i|$, $i\in[1, \ldots, \#$ codewords] (block 380). The subscriber unit may include in its search the codeword in the first level of codewords that maximizes $|HW_i|$, $i\in[1, \ldots, \#$ codewords]. The subscriber unit may then select the codeword that maximizes $|HW_i|$, $i\in[1, \ldots, \#$ codewords] out of the first level of codewords that maximizes $|HW_i|$, $i\in[1, \ldots, \#$ codewords] and its subsidiary codewords as a second-stage quantization of the channel estimate (block 385). Subscriber unit operations 375 may then terminate.

FIG. 4a illustrates a flow diagram of BS operations 400 in transmitting information to a subscriber unit. BS operations 400 may be indicative of operations occurring in a BS, such as BS 201, as the BS receives CSI from a subscriber unit, such as subscriber unit 203, and makes use of the received CSI to improve the performance of transmissions to the subscriber unit. BS operations 400 may occur periodically, when the BS detects that a metric of transmission performance, such as an error rate (e.g., bit-error rate, frame error rate, packet error rate, and so forth) has reached a threshold, when the BS has a transmission to make to the subscriber unit, or so on.

BS operations 400 may begin with the BS receiving feedback information from the subscriber unit (block 405). The feedback information may include quantized CSI. The quantized CSI comprises an index to a codebook, wherein the index corresponds to a codeword in the codebook that most closely matches a channel estimate of a communications channel between the BS and the subscriber unit. According to an embodiment, the codeword is a codeword from the codebook that maximizes the relationship $|HW_i|$, $i\in[1, \ldots, \#$ codewords], where H is a channel matrix, and $W_i$ are codewords of the codebook.

The BS extracts the index from the feedback information (block 410) and reconstructs the channel estimate vector using the codeword from the codebook that corresponds to the index (block 415). As stated previously, both the BS and the subscriber unit have copies of the same codebook. The BS may then use the reconstructed channel estimate vector to adjust radio frequency (RF) hardware in the BS (block 420). The BS may make use of the adjusted RF hardware to transmit to the subscriber unit (block 425). BS operations 400 may then terminate.

FIG. 4b illustrates a flow diagram of BS operations 400 in transmitting information to a subscriber unit, wherein the BS receives CSI from the subscriber unit in two stages. BS operations 450 may be indicative of operations occurring in a BS, such as BS 201, as the BS receives CSI from a subscriber unit, such as subscriber unit 203, and makes use of the received CSI to improve the performance of transmissions to the subscriber unit. BS operations 450 may occur periodically, when the BS detects that a metric of transmission performance, such as an error rate (e.g., bit-error rate, frame error rate, packet error rate, and so forth) has reached a threshold, when the BS has a transmission to make to the subscriber unit, or so on.

BS operations 450 may begin with the BS receiving feedback information from the subscriber unit (block 455). The feedback information may include quantized CSI. The quantized CSI comprises a first index to the codebook, wherein the first index corresponds to a first level codeword in the codebook that most closely matches a channel estimate of a communications channel between the BS and the subscriber unit. According to an embodiment, the codeword is a codeword from the codebook that maximizes the relationship $|HW_i|$, $i\in[1, \ldots, \#$ codewords], where H is a channel matrix, and $W_i$ are codewords of the codebook.

The BS extracts the first index from the feedback information (block 457) and reconstructs the channel estimate vector using the codeword from the codebook that corresponds to the first index (block 459). As stated previously, both the BS and the subscriber unit have copies of the same codebook. The BS may then use the reconstructed channel estimate vector to adjust radio frequency (RF) hardware in the BS (block 461). In an optional step, the BS may make use of the adjusted RF hardware to transmit to the subscriber unit (block 463).

The BS receives additional feedback information from the subscriber unit (block 465). The feedback information may include quantized CSI. The quantized CSI comprises a second index to the codebook, wherein the second index corresponds to a first level codeword in the codebook or one of its subsidiary codeword that most closely matches a channel estimate of a communications channel between the BS and the subscriber unit. According to an embodiment, the codeword is a codeword from the codebook that maximizes the relationship $|HW_i|$, $i \epsilon [1, \ldots, \# \text{ codewords}]$, where H is a channel matrix, and W are codewords of the codebook.

The BS extracts the second index from the feedback information (block 467) and if the codeword corresponding to the second index is equal to the codeword corresponding to the first index, the BS transmits to the subscriber unit (block 471) and BS operations 450 may terminate.

If the codeword corresponding to the second index is different from the codeword corresponding to the first index, the BS reconstructs the channel estimate vector using the codeword from the codebook that corresponds to the second index (block 473). The BS may then use the reconstructed channel estimate vector to adjust radio frequency (RF) hardware in the BS (block 475). The BS may make use of the adjusted RF hardware to transmit to the subscriber unit (block 471) and BS operations 450 may terminate.

According to a preferred embodiment, the codebook discussed above may be a six-bit Rank 1 codebook for use in wireless communications systems with subscriber units using up to four transmit antennas. The codebook also features a hierarchical structure to simplify codeword searching and facilitate differential feedback.

The codebook comprises 64 codewords and is denoted by $W = D \times [W_1; \ldots; W_{64}]$, in which D is the phase rotation diagonal matrix and given by:

$$D = \begin{bmatrix} e^{j\theta_1} & 0 & \cdots & 0 \\ 0 & e^{j\theta_2} & \ddots & \vdots \\ \vdots & \ddots & \ddots & 0 \\ 0 & \cdots & 0 & e^{j\theta_{64}} \end{bmatrix},$$

where $$\theta_i \epsilon [0, 2\pi), i \epsilon [1, \ldots, 64].$$

A codeword in the codebook may be expressible as:

$$W_{4i+j} = U_i K^H Z_j, i \epsilon [0, \ldots, 15], j \epsilon [1, \ldots, 4],$$

where $Z = [z_1, z_2, z_3, z_4]$ and $K = [z_1, k_2, k_3, k_4]$ are two 4×4 unitary matrices, $Z_j$ is the j-th column of Z. Matrices Z and K do not have to be identical. $C = [c_1, \ldots, c_{16}]$ is a 4×16 matrix, where $c_i$, $i \epsilon [1, \ldots, 16]$ is 4×1 vector, and $U_i$ is a 4×4 unitary matrix denoted by $U_i = [c_i, u_{i2}, u_{i3}, u_{i4}]$.

Matrix C is specified as follows:

| | | | | |
|---|---|---|---|---|
| $C_1$ | 0.5000 | −0.5000 | 0.5000 | −0.5000 |
| $C_2$ | −0.5000 | −0.5000 | 0.5000 | 0.5000 |
| $C_3$ | −0.5000 | 0.5000 | 0.5000 | −0.5000 |
| $C_4$ | 0.5000 | −0.5000I | 0.5000 | −0.5000I |
| $C_5$ | −0.5000 | −0.5000I | 0.5000 | 0.5000I |
| $C_6$ | −0.5000 | 0.5000I | 0.5000 | −0.5000I |
| $C_7$ | 0.5000 | 0.5000 | 0.5000 | −0.5000 |
| $C_8$ | 0.5000 | −0.5000I | −0.5000 | −0.5000I |
| $C_9$ | 0.5000 | −0.5000 | 0.5000 | 0.5000 |
| $C_{10}$ | 0.5000 | 0.5000I | −0.5000 | 0.5000I |
| $C_{11}$ | 0.5000 | 0.3536 + 0.3536I | 0.5000I | −0.3536 + 0.3536I |
| $C_{12}$ | 0.5000 | 0.3536 − 0.3536I | −0.5000I | −0.3536 − 0.3536I |
| $C_{13}$ | 0.5000 | −0.3536 − 0.3536I | 0.5000I | 0.3536 − 0.3536I |
| $C_{14}$ | 0.5000 | −0.3536 + 0.3536I | −0.5000I | 0.3536 + 0.3536I |
| $C_{15}$ | 0.5000 | 0.5000 | 0.5000 | 0.5000 |
| $C_{16}$ | 0.5000 | 0.5000I | 0.5000 | 0.5000I |

Matrices Z and K are specified as follows:

$$Z = K = \begin{bmatrix} -0.5 & -0.5 & 0.5j & -0.5j \\ 0.5j & 0.5j & -0.5 & 0.5 \\ 0.5j & -0.5j & -0.5 & -0.5 \\ 0.5 & -0.5 & -0.5j & -0.5j \end{bmatrix}.$$

Matrix U is specified as follows:

$$U_1 = \begin{bmatrix} 0.5 & -0.5 & -0.5 & 0.5 \\ -0.5 & -0.5 & 0.5 & 0.5 \\ 0.5 & 0.5 & 0.5 & 0.5 \\ -0.5 & 0.5 & -0.5 & 0.5 \end{bmatrix}$$

$$U_2 = \begin{bmatrix} -0.5 & -0.5 & 0.5 & 0.5 \\ -0.5 & 0.5 & 0.5 & -0.5 \\ 0.5 & 0.5 & 0.5 & 0.5 \\ 0.5 & -0.5 & 0.5 & -0.5 \end{bmatrix}$$

$$U_3 = \begin{bmatrix} -0.5 & 0.5 & 0.5 & -0.5 \\ 0.5 & 0.5 & -0.5 & -0.5 \\ 0.5 & 0.5 & 0.5 & 0.5 \\ -0.5 & 0.5 & -0.5 & 0.5 \end{bmatrix}$$

$$U_4 = \begin{bmatrix} 0.5 & -0.5 & -0.5 & 0.5 \\ -0.5j & -0.5j & 0.5j & 0.5j \\ 0.5 & 0.5 & 0.5 & 0.5 \\ -0.5j & 0.5j & -0.5j & 0.5j \end{bmatrix}$$

$$U_5 = \begin{bmatrix} -0.5 & -0.5 & 0.5 & 0.5 \\ -0.5j & 0.5j & 0.5j & -0.5j \\ 0.5 & 0.5 & 0.5 & 0.5 \\ 0.5j & -0.5j & 0.5j & -0.5j \end{bmatrix}$$

$$U_6 = \begin{bmatrix} -0.5 & 0.5 & 0.5 & -0.5 \\ 0.5j & 0.5j & -0.5j & -0.5j \\ 0.5 & 0.5 & 0.5 & 0.5 \\ -0.5j & 0.5j & -0.5j & 0.5j \end{bmatrix}$$

$$U_7 = \begin{bmatrix} 0.5 & 0.5 & -0.5 & -0.5 \\ 0.5 & -0.5 & -0.5j & 0.5j \\ 0.5 & 0.5 & 0.5 & 0.5 \\ 0.5 & -0.5 & 0.5j & -0.5j \end{bmatrix}$$

$$U_8 = \begin{bmatrix} 0.5 & 0.5 & -0.5 & -0.5 \\ 0.5j & -0.5j & -0.5 & 0.5 \\ 0.5 & 0.5 & 0.5 & 0.5 \\ 0.5j & -0.5j & 0.5 & -0.5 \end{bmatrix}$$

$$U_9 = \begin{bmatrix} 0.5 & 0.5 & 0.5 & 0.5 \\ 0.5 & -0.5j & -0.5 & 0.5j \\ 0.5 & -0.5 & 0.5 & -0.5 \\ -0.5 & -0.5j & 0.5 & 0.5j \end{bmatrix}$$

$$U_{10} = \begin{bmatrix} 0.5 & 0.5 & 0.5 & 0.5 \\ -0.5j & -0.5 & 0.5j & 0.5 \\ -0.5 & 0.5 & -0.5 & 0.5 \\ -0.5j & 0.5 & 0.5j & -0.5 \end{bmatrix}$$

$$U_{11} = \begin{bmatrix} 0.5 & 0.5 & 0.5 & 0.5 \\ -0.5 & 0.5j & 0.5 & -0.5j \\ 0.5 & -0.5 & 0.5 & -0.5 \\ 0.5 & 0.5j & -0.5 & -0.5j \end{bmatrix}$$

$$U_{12} = \begin{bmatrix} 0.5 & 0.5 & 0.5 & 0.5 \\ 0.5j & 0.5 & -0.5j & -0.5 \\ -0.5 & 0.5 & -0.5 & 0.5 \\ 0.5j & -0.5 & -0.5j & 0.5 \end{bmatrix}$$

$$U_{13} = \begin{bmatrix} 0.5 & 0.5 & 0.5 & 0.5 \\ \sqrt{\tfrac{1}{8}}+\sqrt{\tfrac{1}{8}}j & \sqrt{\tfrac{1}{8}}-\sqrt{\tfrac{1}{8}}j & -\sqrt{\tfrac{1}{8}}-\sqrt{\tfrac{1}{8}}j & -\sqrt{\tfrac{1}{8}}+\sqrt{\tfrac{1}{8}}j \\ 0.5j & -0.5j & 0.5j & -0.5j \\ -\sqrt{\tfrac{1}{8}}+\sqrt{\tfrac{1}{8}}j & -\sqrt{\tfrac{1}{8}}-\sqrt{\tfrac{1}{8}}j & \sqrt{\tfrac{1}{8}}-\sqrt{\tfrac{1}{8}}j & \sqrt{\tfrac{1}{8}}+\sqrt{\tfrac{1}{8}}j \end{bmatrix}$$

$$U_{14} = \begin{bmatrix} 0.5 & 0.5 & 0.5 & 0.5 \\ \sqrt{\tfrac{1}{8}}-\sqrt{\tfrac{1}{8}}j & \sqrt{\tfrac{1}{8}}-\sqrt{\tfrac{1}{8}}j & -\sqrt{\tfrac{1}{8}}-\sqrt{\tfrac{1}{8}}j & -\sqrt{\tfrac{1}{8}}+\sqrt{\tfrac{1}{8}}j \\ -0.5j & 0.5j & -0.5j & 0.5j \\ -\sqrt{\tfrac{1}{8}}-\sqrt{\tfrac{1}{8}}j & \sqrt{\tfrac{1}{8}}-\sqrt{\tfrac{1}{8}}j & \sqrt{\tfrac{1}{8}}+\sqrt{\tfrac{1}{8}}j & -\sqrt{\tfrac{1}{8}}+\sqrt{\tfrac{1}{8}}j \end{bmatrix}$$

-continued $$U_{15} = \begin{bmatrix} 0.5 & 0.5 & 0.5 & 0.5 \\ -\sqrt{\frac{1}{8}} - \sqrt{\frac{1}{8}}j & -\sqrt{\frac{1}{8}} + \sqrt{\frac{1}{8}}j & \sqrt{\frac{1}{8}} + \sqrt{\frac{1}{8}}j & \sqrt{\frac{1}{8}} - \sqrt{\frac{1}{8}}j \\ 0.5j & -0.5j & 0.5j & -0.5j \\ \sqrt{\frac{1}{8}} - \sqrt{\frac{1}{8}}j & \sqrt{\frac{1}{8}} + \sqrt{\frac{1}{8}}j & -\sqrt{\frac{1}{8}} + \sqrt{\frac{1}{8}}j & -\sqrt{\frac{1}{8}} - \sqrt{\frac{1}{8}}j \end{bmatrix}$$

$$U_{16} = \begin{bmatrix} 0.5 & 0.5 & 0.5 & 0.5 \\ -\sqrt{\frac{1}{8}} + \sqrt{\frac{1}{8}}j & \sqrt{\frac{1}{8}} + \sqrt{\frac{1}{8}}j & \sqrt{\frac{1}{8}} - \sqrt{\frac{1}{8}}j & -\sqrt{\frac{1}{8}} - \sqrt{\frac{1}{8}}j \\ -0.5j & 0.5j & -0.5j & 0.5j \\ \sqrt{\frac{1}{8}} + \sqrt{\frac{1}{8}}j & -\sqrt{\frac{1}{8}} + \sqrt{\frac{1}{8}}j & -\sqrt{\frac{1}{8}} - \sqrt{\frac{1}{8}}j & \sqrt{\frac{1}{8}} - \sqrt{\frac{1}{8}}j \end{bmatrix}.$$

From the above definitions of matrices C, Z, K and $U_j$, the codewords $[W_1, \ldots, W_{64}]$ of the codebook W with four place precision is expressible as:

| | | | | |
|---|---|---|---|---|
| $W_1$ | 0.5000 | −0.5000 | 0.5000 | −0.5000 |
| $W_2$ | 0.2570 + 0.1701i | −0.6097 − 0.1826i | 0.2570 − 0.1701i | −0.6097 + 0.1826i |
| $W_3$ | 0.3527 − 0.4396i | 0.4271i | −0.3527 − 0.4396i | 0 + 0.4271i |
| $W_4$ | −0.1701 + 0.2570i | −0.1826 − 0.6097i | 0.1701 + 0.2570i | 0.1826 − 0.6097i |
| $W_5$ | −0.5000 | −0.5000 | 0.5000 | 0.5000 |
| $W_6$ | −0.6097 − 0.1826i | −0.2570 − 0.1701i | 0.2570 − 0.1701i | 0.6097 − 0.1826i |
| $W_7$ | 0 + 0.4271i | −0.3527 + 0.4396i | −0.3527 − 0.4396i | −0.4271i |
| $W_8$ | −0.1826 − 0.6097i | 0.1701 − 0.2570i | 0.1701 + 0.2570i | −0.1826 + 0.6097i |
| $W_9$ | −0.5000 | 0.5000 | 0.5000 | −0.5000 |
| $W_{10}$ | −0.2570 − 0.1701i | 0.6097 + 0.1826i | 0.2570 − 0.1701i | −0.6097 + 0.1826i |
| $W_{11}$ | −0.3527 + 0.4396i | 0 − 0.4271i | −0.3527 − 0.4396i | 0.4271i |
| $W_{12}$ | 0.1701 − 0.2570i | 0.1826 + 0.6097i | 0.1701 + 0.2570i | 0.1826 − 0.6097i |
| $W_{13}$ | 0.5000 | −0.5000i | 0.5000 | −0.5000i |
| $W_{14}$ | 0.2570 + 0.1701i | 0.1826 − 0.6097i | 0.2570 − 0.1701i | −0.1826 − 0.6097i |
| $W_{15}$ | 0.3527 − 0.4396i | −0.4271 | −0.3527 − 0.4396i | −0.4271 |
| $W_{16}$ | −0.1701 + 0.2570i | 0.6097 − 0.1826i | 0.1701 + 0.2570i | 0.6097 + 0.1826i |
| $W_{17}$ | −0.5000 | −0.5000i | 0.5000 | 0.5000i |
| $W_{18}$ | −0.6097 − 0.1826i | 0.1701 − 0.2570i | 0.2570 − 0.1701i | 0.1826 + 0.6097i |
| $W_{19}$ | 0.4271i | −0.4396 − 0.3527i | −0.3527 − 0.4396i | 0.4271 |
| $W_{20}$ | −0.1826 − 0.6097i | 0.2570 + 0.1701i | 0.1701 + 0.2570i | −0.6097 − 0.1826i |
| $W_{21}$ | −0.5000 | 0.5000i | 0.5000 | −0.5000i |
| $W_{22}$ | −0.2570 − 0.1701i | −0.1826 + 0.6097i | 0.2570 − 0.1701i | −0.1826 − 0.6097i |
| $W_{23}$ | −0.3527 + 0.4396i | 0.4271 | −0.3527 − 0.4396i | −0.4271 |
| $W_{24}$ | 0.1701 − 0.2570i | −0.6097 + 0.1826i | 0.1701 + 0.2570i | 0.6097 + 0.1826i |
| $W_{25}$ | 0.5000 | 0.5000 | 0.5000 | 0.5000 |
| $W_{26}$ | 0.6097 + 0.1826i | 0.2570 − 0.1826i | 0.2570 − 0.1701i | 0.6097 + 0.1701i |
| $W_{27}$ | −0.4271i | 0.1826 − 0.2570i | −0.3527 − 0.4396i | 0.1701 − 0.6097i |
| $W_{28}$ | 0.1826 + 0.6097i | 0.4396i | 0.1701 + 0.2570i | −0.3527 + 0.4271i |
| $W_{29}$ | 0.5000 | 0.5000i | 0.5000 | 0.5000i |
| $W_{30}$ | 0.6097 + 0.1826i | −0.1701 + 0.6097i | 0.2570 − 0.1701i | 0.1826 + 0.2570i |
| $W_{31}$ | −0.4271i | 0.6097 + 0.1701i | −0.3527 − 0.4396i | 0.2570 + 0.1826i |
| $W_{32}$ | 0.1826 + 0.6097i | −0.4271 − 0.3527i | 0.1701 + 0.2570i | −0.4396 |
| $W_{33}$ | 0.5000 | 0.5000 | 0.5000 | −0.5000 |
| $W_{34}$ | 0.2570 − 0.1701i | 0.4396 | 0.6097 − 0.1826i | −0.4271 − 0.3527i |
| $W_{35}$ | −0.3527 − 0.4396i | 0.1826 − 0.2570i | −0.4271i | −0.1701 + 0.6097i |
| $W_{36}$ | 0.1701 + 0.2570i | 0.1826 + 0.2570i | −0.1826 + 0.6097i | 0.1701 − 0.6097i |
| $W_{37}$ | 0.5000 | −0.5000i | −0.5000 | −0.5000i |
| $W_{38}$ | 0.2570 − 0.1701i | −0.4396i | −0.6097 + 0.1826i | 0.3527 − 0.4271i |
| $W_{39}$ | −0.3527 − 0.4396i | −0.2570 − 0.1826i | 0.4271i | −0.6097 − 0.1701i |
| $W_{40}$ | 0.1701 + 0.2570i | 0.2570 − 0.1826i | 0.1826 − 0.6097i | 0.6097 + 0.1701i |
| $W_{41}$ | 0.5000 | −0.5000 | 0.5000 | 0.5000 |
| $W_{42}$ | 0.2570 − 0.1701i | −0.4396 | 0.6097 − 0.1826i | 0.4271 + 0.3527i |
| $W_{43}$ | −0.3527 − 0.4396i | −0.1826 + 0.2570i | −0.4271i | 0.1701 − 0.6097i |
| $W_{44}$ | 0.1701 + 0.2570i | −0.1826 − 0.2570i | −0.1826 + 0.6097i | −0.1701 + 0.6097i |
| $W_{45}$ | 0.5000 | 0.5000i | −0.5000 | 0.5000i |
| $W_{46}$ | 0.2570 − 0.1701i | 0.4396i | −0.6097 − 0.1826i | −0.3527 + 0.4271i |
| $W_{47}$ | −0.3527 − 0.4396i | 0.2570 + 0.1826i | 0.4271i | 0.6097 + 0.1701i |
| $W_{48}$ | 0.1701 + 0.2570i | −0.2570 − 0.1826i | 0.1826 − 0.6097i | −0.6097 − 0.1701i |
| $W_{49}$ | 0.5000 | 0.3536 + 0.3536i | 0.5000i | −0.3536 + 0.3536i |
| $W_{50}$ | 0.2570 − 0.1701i | 0.3108 + 0.3108i | 0.1826 + 0.6097i | −0.5514 + 0.0526i |
| $W_{51}$ | −0.3527 − 0.4396i | 0.3108 − 0.0526i | 0.4271 | 0.3108 + 0.5514i |
| $W_{52}$ | 0.1701 + 0.2570i | −0.0526 + 0.3108i | −0.6097 − 0.1826i | −0.3108 − 0.5514i |

-continued

| | | | | |
|---|---|---|---|---|
| $W_{53}$ | 0.5000 | 0.3536 − 0.3536i | −0.5000i | −0.3536 − 0.3536i |
| $W_{54}$ | 0.2570 − 0.1701i | 0.3108 − 0.3108i | −0.1826 − 0.6097i | −0.0526 − 0.5514i |
| $W_{55}$ | −0.3527 − 0.4396i | −0.0526 − 0.3108i | −0.4271 | −0.5514 + 0.3108i |
| $W_{56}$ | 0.1701 + 0.2570i | 0.3108 + 0.0526i | 0.6097 + 0.1826i | 0.5514 − 0.3108i |
| $W_{57}$ | 0.5000 | −0.3536 − 0.3536i | 0.5000i | 0.3536 − 0.3536i |
| $W_{58}$ | 0.2570 − 0.1701i | −0.3108 − 0.3108i | 0.1826 + 0.6097i | 0.5514 − 0.0526i |
| $W_{59}$ | −0.3527 − 0.4396i | −0.3108 + 0.0526i | 0.4271 | −0.3108 − 0.5514i |
| $W_{60}$ | 0.1701 + 0.2570i | 0.0526 − 0.3108i | −0.6097 − 0.1826i | 0.3108 + 0.5514i |
| $W_{61}$ | 0.5000 | −0.3536 + 0.3536i | −0.5000i | 0.3536 + 0.3536i |
| $W_{62}$ | 0.2570 − 0.1701i | −0.3108 + 0.3108i | −0.1826 − 0.6097i | 0.0526 + 0.5514i |
| $W_{63}$ | −0.3527 − 0.4396i | 0.0526 + 0.3108i | −0.4271 | 0.5514 − 0.3108i |
| $W_{64}$ | 0.1701 + 0.2570i | −0.3108 − 0.0526i | 0.6097 + 0.1826i | −0.5514 + 0.3108i |

Although the embodiments and their advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for communications device operation, the method comprising:
   estimating a communications channel between the communications device and a controller serving the communications device, thereby producing a channel estimate;
   quantizing the channel estimate using a codebook, wherein the codebook comprises a plurality of first level codewords, and wherein each first level codeword has a plurality of subsidiary codewords, thereby producing a selected codeword; and
   transmitting an index corresponding to the selected codeword from the codebook to the controller,
   wherein quantizing the channel estimate using a codebook comprises:
   selecting a first level codeword from the plurality of first level codewords that maximizes $|HW_i|$, i∈[1, . . . , # first level codewords], where H is a channel matrix, and $W_i$ are codewords of codebook, and # first level codewords is the number of first level codewords in the plurality of first level codewords;
   selecting a subsidiary codeword from the plurality of subsidiary codewords of the first level codeword that maximizes $|HW_i|$, i∈[1, . . . , # subsidiary codewords], where # subsidiary codewords is the number of subsidiary codewords of the first level codeword; and
   selecting either the first level codeword or the subsidiary codeword based on which codeword maximizes $|HW_i|$, i∈[the first codeword, the subsidiary codeword] as the selected codeword.

2. The method of claim 1, wherein selecting either the first level codeword or the subsidiary codeword comprises selecting the first level codeword in response to determining that the first level codeword and the subsidiary codeword substantially equally maximizes $|HW_i|$, i∈[the first codeword, the subsidiary codeword].

3. The method of claim 1, wherein selecting either the first level codeword or the subsidiary codeword comprises randomly selecting either the first level codeword or the subsidiary codeword in response to determining the first level codeword and the subsidiary codeword substantially equally maximizes $|HW_i|$, i∈[the first codeword, the subsidiary codeword].

4. The method of claim 1, wherein the communications device comprises four transmit antennas, and wherein the codebook is expressible as:

$$W = D \times [W_1; \ldots ; W_{64}],$$

where D is the phase rotation diagonal matrix and given by $$D = \begin{bmatrix} e^{j\theta_1} & 0 & \ldots & 0 \\ 0 & e^{j\theta_2} & \ddots & \vdots \\ \vdots & \ddots & \ddots & 0 \\ 0 & \ldots & 0 & e^{j\theta_{64}} \end{bmatrix},$$

where $\theta_i \in [0, 2\pi)$, i∈[1, . . . , 64].

5. The method of claim 1, wherein the number of subsidiary codewords in each plurality of subsidiary codewords is equal.

6. A method for communications device operation, the method comprising:
   estimating a communications channel between the communications device and a controller serving the communications device, thereby producing a channel estimate;
   quantizing the channel estimate using a codebook, wherein the codebook comprises a plurality of first level codewords, and wherein each first level codeword has a plurality of subsidiary codewords, thereby producing a selected codeword; and
   transmitting an index corresponding to the selected codeword from the codebook to the controller,
   wherein the communications device comprises four transmit antennas,
   wherein the codebook is expressible as: $W = D \times [W_1; \ldots ; W_{64}]$, where D is the phase rotation diagonal matrix and given by $$D = \begin{bmatrix} e^{j\theta_1} & 0 & \cdots & 0 \\ 0 & e^{j\theta_2} & \ddots & \vdots \\ \vdots & \ddots & \ddots & 0 \\ 0 & \cdots & 0 & e^{j\theta_{64}} \end{bmatrix},$$

where $\theta_i \in [0, 2\pi)$, $i \in [1, \ldots, 64]$, and
wherein a codeword in the codebook is expressible as:

$$W_{4i+j} = U_i K^H z_j, \; i \in [0, \ldots, 15], \; j \in [1, \ldots, 4],$$

where $Z = [z_1, z_2, z_3, z_4]$ and $K = [z_1, k_2, k_3, k_4]$ are two 4×4 unitary matrices, $z_j$ is the j-th column of Z, matrices Z and K do not have to be identical, $C = [c_1, \ldots, c_{16}]$ is a 4×16 matrix, $c_i$, $i \in [1, \ldots, 16]$ is 4×1 vector, and $U_i$ is a 4×4 unitary matrix denoted by $U_i = [c_i, u_{i2}, u_{i3}, u_{i4}]$.

7. The method of claim 6, wherein matrix C is specified as follows:

| | | | | |
|---|---|---|---|---|
| $c_1$ | 0.5000 | −0.5000 | 0.5000 | −0.5000 |
| $c_2$ | −0.5000 | −0.5000 | 0.5000 | 0.5000 |
| $c_3$ | −0.5000 | 0.5000 | 0.5000 | −0.5000 |
| $c_4$ | 0.5000 | −0.5000I | 0.5000 | −0.5000I |
| $c_5$ | −0.5000 | −0.5000I | 0.5000 | 0.5000I |
| $c_6$ | −0.5000 | 0.5000I | 0.5000 | −0.5000I |
| $c_7$ | 0.5000 | 0.5000 | 0.5000 | −0.5000 |
| $c_8$ | 0.5000 | −0.5000I | −0.5000 | −0.5000I |
| $c_9$ | 0.5000 | −0.5000 | 0.5000 | 0.5000 |
| $c_{10}$ | 0.5000 | 0.5000I | −0.5000 | 0.5000I |
| $c_{11}$ | 0.5000 | 0.3536 + 0.3536I | 0.5000I | −0.3536 + 0.3536I |
| $c_{12}$ | 0.5000 | 0.3536 − 0.3536I | −0.5000I | −0.3536 − 0.3536I |
| $c_{13}$ | 0.5000 | −0.3536 − 0.3536I | 0.5000I | 0.3536 − 0.3536I |
| $c_{14}$ | 0.5000 | −0.3536 + 0.3536I | −0.5000I | 0.3536 + 0.3536I |
| $c_{15}$ | 0.5000 | 0.5000 | 0.5000 | 0.5000 |
| $c_{16}$ | 0.5000 | 0.5000I | 0.5000 | 0.5000I |

8. The method of claim 6, wherein matrices Z and K are specified as follows:

$$Z = K = \begin{bmatrix} -0.5 & -0.5 & 0.5j & -0.5j \\ 0.5j & 0.5j & -0.5 & 0.5 \\ 0.5j & -0.5j & -0.5 & -0.5 \\ 0.5 & -0.5 & -0.5j & -0.5j \end{bmatrix}.$$

9. The method of claim 6, wherein matrix U is specified as follows:

$$U_1 = \begin{bmatrix} 0.5 & -0.5 & -0.5 & 0.5 \\ -0.5 & -0.5 & 0.5 & 0.5 \\ 0.5 & 0.5 & 0.5 & 0.5 \\ -0.5 & 0.5 & -0.5 & 0.5 \end{bmatrix}$$

$$U_2 = \begin{bmatrix} -0.5 & -0.5 & 0.5 & 0.5 \\ -0.5 & 0.5 & 0.5 & -0.5 \\ 0.5 & 0.5 & 0.5 & 0.5 \\ 0.5 & -0.5 & 0.5 & -0.5 \end{bmatrix}$$

$$U_3 = \begin{bmatrix} -0.5 & 0.5 & 0.5 & -0.5 \\ 0.5 & 0.5 & -0.5 & -0.5 \\ 0.5 & 0.5 & 0.5 & 0.5 \\ -0.5 & 0.5 & -0.5 & 0.5 \end{bmatrix}$$

$$U_4 = \begin{bmatrix} 0.5 & -0.5 & -0.5 & 0.5 \\ -0.5j & -0.5j & 0.5j & 0.5j \\ 0.5 & 0.5 & 0.5 & 0.5 \\ -0.5j & 0.5j & -0.5j & 0.5j \end{bmatrix}$$

$$U_5 = \begin{bmatrix} -0.5 & -0.5 & 0.5 & 0.5 \\ -0.5j & 0.5j & 0.5j & -0.5j \\ 0.5 & 0.5 & 0.5 & 0.5 \\ 0.5j & -0.5j & 0.5j & -0.5j \end{bmatrix}$$

$$U_6 = \begin{bmatrix} -0.5 & 0.5 & 0.5 & -0.5 \\ 0.5j & 0.5j & -0.5j & -0.5j \\ 0.5 & 0.5 & 0.5 & 0.5 \\ -0.5j & 0.5j & -0.5j & 0.5j \end{bmatrix}$$

$$U_7 = \begin{bmatrix} 0.5 & 0.5 & -0.5 & -0.5 \\ 0.5 & -0.5 & -0.5j & 0.5j \\ 0.5 & 0.5 & 0.5 & 0.5 \\ 0.5 & -0.5 & 0.5j & -0.5j \end{bmatrix}$$

-continued $$U_8 = \begin{bmatrix} 0.5 & 0.5 & -0.5 & -0.5 \\ 0.5j & -0.5j & -0.5 & 0.5 \\ 0.5 & 0.5 & 0.5 & 0.5 \\ 0.5j & -0.5j & 0.5 & -0.5 \end{bmatrix}$$

$$U_9 = \begin{bmatrix} 0.5 & 0.5 & 0.5 & 0.5 \\ 0.5 & -0.5j & -0.5 & 0.5j \\ 0.5 & -0.5 & 0.5 & -0.5 \\ -0.5 & -0.5j & 0.5 & 0.5j \end{bmatrix}$$

$$U_{10} = \begin{bmatrix} 0.5 & 0.5 & 0.5 & 0.5 \\ -0.5j & -0.5 & 0.5j & 0.5 \\ -0.5 & 0.5 & -0.5 & 0.5 \\ -0.5j & 0.5 & 0.5j & -0.5 \end{bmatrix}$$

$$U_{11} = \begin{bmatrix} 0.5 & 0.5 & 0.5 & 0.5 \\ -0.5 & 0.5j & 0.5 & -0.5j \\ 0.5 & -0.5 & 0.5 & -0.5 \\ 0.5 & 0.5j & -0.5 & -0.5j \end{bmatrix}$$

$$U_{12} = \begin{bmatrix} 0.5 & 0.5 & 0.5 & 0.5 \\ 0.5j & 0.5 & -0.5j & -0.5 \\ -0.5 & 0.5 & -0.5 & 0.5 \\ 0.5j & -0.5 & -0.5j & 0.5 \end{bmatrix}$$

$$U_{13} = \begin{bmatrix} 0.5 & 0.5 & 0.5 & 0.5 \\ \sqrt{\tfrac{1}{8}}+\sqrt{\tfrac{1}{8}}j & \sqrt{\tfrac{1}{8}}-\sqrt{\tfrac{1}{8}}j & -\sqrt{\tfrac{1}{8}}-\sqrt{\tfrac{1}{8}}j & -\sqrt{\tfrac{1}{8}}+\sqrt{\tfrac{1}{8}}j \\ 0.5j & -0.5j & 0.5j & -0.5j \\ -\sqrt{\tfrac{1}{8}}+\sqrt{\tfrac{1}{8}}j & -\sqrt{\tfrac{1}{8}}-\sqrt{\tfrac{1}{8}}j & \sqrt{\tfrac{1}{8}}-\sqrt{\tfrac{1}{8}}j & \sqrt{\tfrac{1}{8}}+\sqrt{\tfrac{1}{8}}j \end{bmatrix}$$

$$U_{14} = \begin{bmatrix} 0.5 & 0.5 & 0.5 & 0.5 \\ \sqrt{\tfrac{1}{8}}-\sqrt{\tfrac{1}{8}}j & \sqrt{\tfrac{1}{8}}-\sqrt{\tfrac{1}{8}}j & -\sqrt{\tfrac{1}{8}}-\sqrt{\tfrac{1}{8}}j & -\sqrt{\tfrac{1}{8}}+\sqrt{\tfrac{1}{8}}j \\ -0.5j & 0.5j & -0.5j & 0.5j \\ -\sqrt{\tfrac{1}{8}}-\sqrt{\tfrac{1}{8}}j & \sqrt{\tfrac{1}{8}}-\sqrt{\tfrac{1}{8}}j & \sqrt{\tfrac{1}{8}}+\sqrt{\tfrac{1}{8}}j & -\sqrt{\tfrac{1}{8}}+\sqrt{\tfrac{1}{8}}j \end{bmatrix}$$

$$U_{15} = \begin{bmatrix} 0.5 & 0.5 & 0.5 & 0.5 \\ -\sqrt{\tfrac{1}{8}}-\sqrt{\tfrac{1}{8}}j & -\sqrt{\tfrac{1}{8}}+\sqrt{\tfrac{1}{8}}j & \sqrt{\tfrac{1}{8}}+\sqrt{\tfrac{1}{8}}j & \sqrt{\tfrac{1}{8}}-\sqrt{\tfrac{1}{8}}j \\ 0.5j & -0.5j & 0.5j & -0.5j \\ \sqrt{\tfrac{1}{8}}-\sqrt{\tfrac{1}{8}}j & \sqrt{\tfrac{1}{8}}+\sqrt{\tfrac{1}{8}}j & -\sqrt{\tfrac{1}{8}}+\sqrt{\tfrac{1}{8}}j & -\sqrt{\tfrac{1}{8}}-\sqrt{\tfrac{1}{8}}j \end{bmatrix}$$

$$U_{16} = \begin{bmatrix} 0.5 & 0.5 & 0.5 & 0.5 \\ -\sqrt{\tfrac{1}{8}}+\sqrt{\tfrac{1}{8}}j & \sqrt{\tfrac{1}{8}}+\sqrt{\tfrac{1}{8}}j & \sqrt{\tfrac{1}{8}}-\sqrt{\tfrac{1}{8}}j & -\sqrt{\tfrac{1}{8}}-\sqrt{\tfrac{1}{8}}j \\ -0.5j & 0.5j & -0.5j & 0.5j \\ \sqrt{\tfrac{1}{8}}+\sqrt{\tfrac{1}{8}}j & -\sqrt{\tfrac{1}{8}}+\sqrt{\tfrac{1}{8}}j & -\sqrt{\tfrac{1}{8}}-\sqrt{\tfrac{1}{8}}j & \sqrt{\tfrac{1}{8}}-\sqrt{\tfrac{1}{8}}j \end{bmatrix}.$$

10. The method of claim 6, wherein the codewords $[W_1, \ldots, W_{64}]$ of the codebook W with four place precision are expressible as:

| | | | | |
|---|---|---|---|---|
| $W_1$ | 0.5000 | −0.5000 | 0.5000 | −0.5000 |
| $W_2$ | 0.2570 + 0.1701i | −0.6097 − 0.1826i | 0.2570 − 0.1701i | −0.6097 + 0.1826i |

-continued

| | | | | |
|---|---|---|---|---|
| $W_3$ | 0.3527 − 0.4396i | 0.4271i | −0.3527 − 0.4396i | 0 + 0.4271i |
| $W_4$ | −0.1701 + 0.2570i | −0.1826 − 0.6097i | 0.1701 + 0.2570i | 0.1826 − 0.6097i |
| $W_5$ | −0.5000 | −0.5000 | 0.5000 | 0.5000 |
| $W_6$ | −0.6097 − 0.1826i | −0.2570 − 0.1701i | 0.2570 − 0.1701i | 0.6097 − 0.1826i |
| $W_7$ | 0 + 0.4271i | −0.3527 + 0.4396i | −0.3527 − 0.4396i | −0.4271i |
| $W_8$ | −0.1826 − 0.6097i | 0.1701 − 0.2570i | 0.1701 + 0.2570i | −0.1826 + 0.6097i |
| $W_9$ | −0.5000 | 0.5000 | 0.5000 | −0.5000 |
| $W_{10}$ | −0.2570 − 0.1701i | 0.6097 + 0.1826i | 0.2570 − 0.1701i | −0.6097 + 0.1826i |
| $W_{11}$ | −0.3527 + 0.4396i | 0 − 0.4271i | −0.3527 − 0.4396i | 0.4271i |
| $W_{12}$ | 0.1701 − 0.2570i | 0.1826 + 0.6097i | 0.1701 + 0.2570i | 0.1826 − 0.6097i |
| $W_{13}$ | 0.5000 | −0.5000i | 0.5000 | −0.5000i |
| $W_{14}$ | 0.2570 + 0.1701i | 0.1826 − 0.6097i | 0.2570 − 0.1701i | −0.1826 − 0.6097i |
| $W_{15}$ | 0.3527 − 0.4396i | −0.4271 | −0.3527 − 0.4396i | −0.4271 |
| $W_{16}$ | −0.1701 + 0.2570i | 0.6097 − 0.1826i | 0.1701 + 0.2570i | 0.6097 + 0.1826i |
| $W_{17}$ | −0.5000 | −0.5000i | 0.5000 | 0.5000i |
| $W_{18}$ | −0.6097 − 0.1826i | 0.1701 − 0.2570i | 0.2570 − 0.1701i | 0.1826 − 0.6097i |
| $W_{19}$ | 0.4271i | −0.4396 − 0.3527i | −0.3527 − 0.4396i | 0.4271 |
| $W_{20}$ | −0.1826 − 0.6097i | 0.2570 + 0.1701i | 0.1701 + 0.2570i | −0.6097 − 0.1826i |
| $W_{21}$ | −0.5000 | 0.5000i | 0.5000 | −0.5000i |
| $W_{22}$ | −0.2570 − 0.1701i | −0.1826 + 0.6097i | 0.2570 − 0.1701i | −0.1826 − 0.6097i |
| $W_{23}$ | −0.3527 + 0.4396i | 0.4271 | −0.3527 − 0.4396i | −0.4271 |
| $W_{24}$ | 0.1701 − 0.2570i | −0.6097 + 0.1826i | 0.1701 + 0.2570i | 0.6097 + 0.1826i |
| $W_{25}$ | 0.5000 | 0.5000 | 0.5000 | 0.5000 |
| $W_{26}$ | 0.6097 + 0.1826i | 0.2570 − 0.1826i | 0.2570 − 0.1701i | 0.6097 + 0.1701i |
| $W_{27}$ | −0.4271i | 0.1826 − 0.2570i | −0.3527 − 0.4396i | 0.1701 − 0.6097i |
| $W_{28}$ | 0.1826 + 0.6097i | 0.4396i | 0.1701 + 0.2570i | −0.3527 + 0.4271i |
| $W_{29}$ | 0.5000 | 0.5000i | 0.5000 | 0.5000i |
| $W_{30}$ | 0.6097 + 0.1826i | −0.1701 + 0.6097i | 0.2570 − 0.1701i | 0.1826 + 0.2570i |
| $W_{31}$ | −0.4271i | 0.6097 + 0.1701i | −0.3527 − 0.4396i | 0.2570 + 0.1826i |
| $W_{32}$ | 0.1826 + 0.6097i | −0.4271 − 0.3527i | 0.1701 + 0.2570i | −0.4396 |
| $W_{33}$ | 0.5000 | 0.5000 | 0.5000 | −0.5000 |
| $W_{34}$ | 0.2570 − 0.1701i | 0.4396 | 0.6097 − 0.1826i | −0.4271 − 0.3527i |
| $W_{35}$ | −0.3527 − 0.4396i | 0.1826 − 0.2570i | −0.4271i | −0.1701 + 0.6097i |
| $W_{36}$ | 0.1701 + 0.2570i | 0.1826 + 0.2570i | −0.1826 − 0.6097i | 0.1701 − 0.6097i |
| $W_{37}$ | 0.5000 | −0.5000i | −0.5000 | −0.5000i |
| $W_{38}$ | 0.2570 − 0.1701i | −0.4396i | −0.6097 + 0.1826i | 0.3527 − 0.4271i |
| $W_{39}$ | −0.3527 − 0.4396i | −0.2570 − 0.1826i | 0.4271i | −0.6097 − 0.1701i |
| $W_{40}$ | 0.1701 + 0.2570i | 0.2570 − 0.1826i | 0.1826 − 0.6097i | 0.6097 + 0.1701i |
| $W_{41}$ | 0.5000 | −0.5000 | 0.5000 | 0.5000 |
| $W_{42}$ | 0.2570 − 0.1701i | −0.4396 | 0.6097 − 0.1826i | 0.4271 + 0.3527i |
| $W_{43}$ | −0.3527 − 0.4396i | −0.1826 + 0.2570i | −0.4271i | 0.1701 − 0.6097i |
| $W_{44}$ | 0.1701 + 0.2570i | −0.1826 − 0.2570i | −0.1826 − 0.6097i | −0.1701 + 0.6097i |
| $W_{45}$ | 0.5000 | 0.5000i | −0.5000 | 0.5000i |
| $W_{46}$ | 0.2570 − 0.1701i | 0.4396i | −0.6097 + 0.1826i | −0.3527 + 0.4271i |
| $W_{47}$ | −0.3527 − 0.4396i | 0.2570 + 0.1826i | 0.4271i | 0.6097 + 0.1701i |
| $W_{48}$ | 0.1701 + 0.2570i | −0.2570 + 0.1826i | 0.1826 − 0.6097i | −0.6097 − 0.1701i |
| $W_{49}$ | 0.5000 | 0.3536 + 0.3536i | 0.5000i | −0.3536 + 0.3536i |
| $W_{50}$ | 0.2570 − 0.1701i | 0.3108 + 0.3108i | 0.1826 + 0.6097i | −0.5514 + 0.0526i |
| $W_{51}$ | −0.3527 − 0.4396i | 0.3108 − 0.0526i | 0.4271 | 0.3108 + 0.5514i |
| $W_{52}$ | 0.1701 + 0.2570i | −0.0526 − 0.3108i | −0.6097 − 0.1826i | −0.3108 − 0.5514i |
| $W_{53}$ | 0.5000 | 0.3536 − 0.3536i | −0.5000i | −0.3536 − 0.3536i |
| $W_{54}$ | 0.2570 − 0.1701i | 0.3108 − 0.3108i | −0.1826 − 0.6097i | −0.0526 − 0.5514i |
| $W_{55}$ | −0.3527 − 0.4396i | −0.0526 − 0.3108i | −0.4271 | −0.5514 + 0.3108i |
| $W_{56}$ | 0.1701 + 0.2570i | 0.3108 + 0.0526i | 0.6097 + 0.1826i | 0.5514 − 0.3108i |
| $W_{57}$ | 0.5000 | −0.3536 − 0.3536i | 0.5000i | 0.3536 − 0.3536i |
| $W_{58}$ | 0.2570 − 0.1701i | −0.3108 − 0.3108i | 0.1826 + 0.6097i | 0.5514 − 0.0526i |
| $W_{59}$ | −0.3527 − 0.4396i | −0.3108 + 0.0526i | 0.4271 | −0.3108 − 0.5514i |
| $W_{60}$ | 0.1701 + 0.2570i | 0.0526 − 0.3108i | −0.6097 − 0.1826i | 0.3108 + 0.5514i |
| $W_{61}$ | 0.5000 | −0.3536 + 0.3536i | −0.5000i | 0.3536 + 0.3536i |
| $W_{62}$ | 0.2570 − 0.1701i | −0.3108 + 0.3108i | −0.1826 − 0.6097i | 0.0526 + 0.5514i |
| $W_{63}$ | −0.3527 − 0.4396i | 0.0526 + 0.3108i | −0.427i | 0.5514 − 0.3108i |
| $W_{64}$ | 0.1701 + 0.2570i | −0.3108 − 0.0526i | 0.6097 + 0.1826i | −0.5514 + 0.3108i |

11. A method for communications device operation, the method comprising:

estimating a communications channel between the communications device and a controller serving the communications device, thereby producing a channel estimate;

performing a first stage quantization of the channel estimate using a codebook, wherein the codebook comprises a plurality of first level codewords, wherein each first level codeword has a plurality of subsidiary codewords, and wherein the first stage quantization uses only the plurality of first level codewords, thereby producing a selected first level codeword;

transmitting a first index corresponding to the selected first level codeword from the codebook to the controller;

performing a second stage quantization of the channel estimate using the codebook, wherein the second stage quantization uses the entirety of the codebook, thereby producing a selected codeword; and transmitting a second index corresponding to the selected codeword from the codebook to the controller, wherein performing a first stage quantization of the channel estimate comprises, selecting a first level codeword from the plurality of first level codewords that maximizes $|HW_i|$, $i \in [1, \ldots , \text{\# first level codewords}]$ as the selected first level codeword, where H is a channel matrix, and $W_i$ are codewords of codebook, and # first level codewords is the number of first level codewords in the plurality of first level codewords.

12. A method for communications device operation, the method comprising:
   estimating a communications channel between the communications device and a controller serving the communications device, thereby producing a channel estimate;
   performing a first stage quantization of the channel estimate using a codebook, wherein the codebook comprises a plurality of first level codewords, wherein each first level codeword has a plurality of subsidiary codewords, and wherein the first stage quantization uses only the plurality of first level codewords, thereby producing a selected first level codeword;
   transmitting a first index corresponding to the selected first level codeword from the codebook to the controller;
   performing a second stage quantization of the channel estimate using the codebook, wherein the second stage quantization uses the entirety of the codebook, thereby producing a selected codeword; and
   transmitting a second index corresponding to the selected codeword from the codebook to the controller,
   wherein performing a second stage quantization of the channel estimate comprises:
   selecting a subsidiary codeword from the plurality of subsidiary codewords of the selected first level codeword that maximizes $|HW_i|$, $i\epsilon[1, \ldots, \#$ subsidiary codewords], where H is a channel matrix, and $W_i$ are codewords of codebook, and # subsidiary codewords is the number of subsidiary codewords of the first level codeword; and
   selecting either the selected first level codeword or the subsidiary codeword based on which codeword maximizes $|HW_i|$, $i\epsilon[$the first codeword, the subsidiary codeword] as the selected codeword.

13. The method of claim 12, wherein selecting either the selected first level codeword or the subsidiary codeword comprises, selecting the selected first level codeword in response to determining that the first level codeword and the subsidiary codeword substantially equally maximizes $|HW_i|$, $i\epsilon[$the first codeword, the subsidiary codeword].

14. The method of claim 12, further comprising, normalizing the channel estimate prior to performing a first stage quantization of the channel estimate.

15. A method for controller operation, the method comprising:
   receiving a first channel state information (CSI) from a communications device, wherein the first CSI comprises a first index to a first level codeword in a codebook, wherein the codebook comprises a plurality of first level codewords, wherein each first level codeword has a plurality of subsidiary codewords;
   reconstructing a first channel estimate using the codebook and the first index;
   adjusting transmission circuitry in the controller using the reconstructed first channel estimate; and
   receiving a second CSI from a communications device, wherein the second CSI comprises a second index to a codeword in the codebook;
   wherein in response to determining that the first index is different from the second index, the method further comprises:
      reconstructing a second channel estimate using the codebook and the second index,
      adjusting transmission circuitry in the controller using the reconstructed second channel estimate;
      transmitting a first transmission to the communications device using the adjusted transmission circuitry,
      wherein transmitting the first transmission comprises:
      in response to determining that the first index is not different from the second index, precoding the transmission with the reconstructed first channel estimate, thereby producing a first precoded transmission, and transmitting the first precoded transmission to the communications device; and
      in response to determining that the first index is different from the second index, precoding the transmission with the reconstructed second channel estimate, thereby producing a second precoded transmission, and transmitting the second precoded transmission to the communications device.

16. The method of claim 15, further comprising, prior to receiving a second CSI, transmitting a second transmission to the communications device.

17. The method of claim 15, wherein the first CSI is encoded in a message from the communications device, and wherein receiving a first CSI comprises:
   receiving the first CSI; and
   decoding the first CSI to extract the first index.

18. A communications device comprising:
   a processor; and
   a computer readable storage medium storing programming for execution by the processor, the programming including instructions to:
   perform channel estimation on a communications channel between the communications device and a controller serving the communications device to produce a channel estimate;
   quantize the channel estimate using a codebook to produce a selected codeword, wherein the codebook comprises a plurality of first level codewords and a plurality of subsidiary codewords, and wherein each first level codeword corresponds to a unique sub-set of the plurality of subsidiary codewords, wherein fewer than all of the plurality of subsidiary codewords are included in the unique sub-set of subsidiary codewords corresponding to the optimal first level codeword, and wherein none of the plurality of first level codewords are subsidiary codewords; and
   transmit an index corresponding to the selected codeword from the codebook to the controller.

19. The communications device of claim 18, wherein the instructions to quantize the channel estimate include instructions to:
   analyze the plurality of first level codewords to identify an optimal one of the plurality of first level codewords;
   analyze each subsidiary codeword in the unique sub-set of subsidiary codewords that corresponds to the optimal first level codeword to identify an optimal subsidiary codeword, wherein subsidiary codewords in the plurality of subsidiary codewords that are not included in the unique sub-set of subsidiary codewords corresponding to the optimal first level codeword are not analyzed during said quantization; and
   pursuant to said analysis, select one of the optimal first level codeword or the optimal subsidiary codeword as the selected codeword.

20. A communications device for performing quantization using a codebook that includes a plurality of first level codewords and a plurality of subsidiary codewords, the communications device comprising:

a processor; and a computer readable storage medium storing programming for execution by the processor, the programming including instructions to:
- estimate a communications channel between the communications device and a controller serving the communications device to produce a channel estimate;
- perform a first stage quantization of the channel estimate to identify an optimal one of the plurality of first level codewords;
- transmit a first indication that identifies the optimal first level codeword;
- subsequent to transmitting the first indication, perform a second stage quantization of the channel estimate to identify an optimal codeword; and
- transmit a second indication that identifies the optimal codeword,
- wherein each of the plurality of first level codewords corresponds to a unique sub-set of the plurality of subsidiary codewords, and
- wherein the instructions to perform the second stage quantization include instructions to analyze each subsidiary codeword in the unique sub-set of subsidiary codewords corresponding to the optimal first level codeword without analyzing ones of the plurality of subsidiary codewords that are not in the unique sub-set of subsidiary codewords corresponding to the optimal first level codeword.

21. The communications device of claim 20, wherein the instructions to perform the first stage quantization include instructions to analyze each of the plurality of first level codewords without analyzing any of the subsidiary codewords.

22. The communications device of claim 21, wherein the instructions to perform the second stage quantization include instructions to analyze at least some of the plurality of subsidiary codewords.

23. The communications device of claim 20, wherein fewer than all of the plurality of subsidiary codewords are included in the unique sub-set of subsidiary codewords corresponding to the optimal first level codeword, and wherein none of the first level codewords are subsidiary codewords.

* * * * *